United States Patent
Nougier et al.

(10) Patent No.: US 7,422,728 B2
(45) Date of Patent: Sep. 9, 2008

(54) PARTIAL OXIDATION REACTOR

(75) Inventors: Luc Nougier, Sainte Foy les Lyon (FR); Stéphane Bertholin, Villeurbanne (FR); Willy Nastoll, Les Roches de Condrieu (FR)

(73) Assignee: Institut Francais du Petrole, Rueil Malmaison (FR)

( * ) Notice: Subject to any disclaimer, the term of this patent is extended or adjusted under 35 U.S.C. 154(b) by 812 days.

(21) Appl. No.: 10/762,238

(22) Filed: Jan. 23, 2004

(65) Prior Publication Data
US 2004/0151663 A1 Aug. 5, 2004

(30) Foreign Application Priority Data
Jan. 23, 2003 (FR) .................................. 03 00751

(51) Int. Cl.
*B01J 8/04* (2006.01)
*B01J 8/02* (2006.01)
(52) U.S. Cl. .................. 422/190; 422/193; 422/195; 422/198; 422/202; 422/211; 422/191; 422/188; 422/189; 422/194; 429/19; 429/20; 48/61
(58) Field of Classification Search .............. 422/198, 422/203, 228, 224, 202, 204, 205
See application file for complete search history.

(56) References Cited

U.S. PATENT DOCUMENTS

| | | | | |
|---|---|---|---|---|
| 4,650,651 A | * | 3/1987 | Fuderer | 422/191 |
| 5,037,619 A | | 8/1991 | Alagy et al. | |
| 5,437,123 A | | 8/1995 | Moard et al. | |
| 6,126,908 A | * | 10/2000 | Clawson et al. | 422/190 |
| 6,207,122 B1 | | 3/2001 | Bentley et al. | |
| 6,936,238 B2 | * | 8/2005 | Sennoun et al. | 423/652 |
| 7,367,996 B2 | * | 5/2008 | Clawson et al. | 48/61 |

FOREIGN PATENT DOCUMENTS

| | | |
|---|---|---|
| DE | 19955892 | 6/2001 |
| FR | 2592320 | 7/1987 |

* cited by examiner

*Primary Examiner*—Alexa Neckel
*Assistant Examiner*—Kaity Handal
(74) *Attorney, Agent, or Firm*—Millen, White, Zelano, Branigan, P.C.

(57) ABSTRACT

A reactor intended to carry out partial oxidation reactions starting from liquid feedstocks that can go from GPL to gas oil for the purpose of producing synthesis gas is characterized by finely controlled hydrodynamics and a high degree of thermal integration, and comprises an elongated jacket along an axis of any orientation, means (12) for supplying a preheated gas that contains oxygen and optionally water vapor, means (9) for supplying a hydrocarbon feedstock, means (11) for evacuation of a hydrogen-rich effluent, a first internal chamber (5) inside of which is carried out an essentially isothermal partial oxidation reaction that is connected to means (9) for supplying the hydrocarbon feedstock and to means (12) for supplying preheated gas, gas turbulizing means that are suitable for creating a perfect mixing flow, means (8) for linking first chamber (5) to a second chamber (7) with a suitable volume for carrying out a piston flow, linking means (8) that comprise at least one orifice, and second chamber (7) exchanging heat in an indirect manner over at least a portion of its length with means (12) for supplying said thus preheated gas, whereby the second chamber is connected to said means (11) for evacuating the hydrogen-rich effluent, and in which gas supply means (12) comprise an annular chamber that is essentially coaxial with the reactor jacket, and second chamber (7) is essentially coaxial with said jacket.

15 Claims, 3 Drawing Sheets

PARTIAL OXIDATION REACTOR

TECHNOLOGICAL BACKGROUND

This invention relates to the field of reactors that are intended to carry out non-catalytic partial oxidation reactions starting from very diverse hydrocarbon fractions for the purpose of producing a mixture of carbon monoxide (CO) and hydrogen (H2) that is called synthesis gas. The reactors that are targeted by this invention are more particularly intended for small-capacity applications as opposed to standard industrial applications such as Fischer-Tropsch synthesis or ammonia synthesis.

In this case, installed thermal powers of between 0.1 kW and 1000 kW are considered. The targeted markets are then the supply of hydrogen-rich gas for fuel-cell-type (PAC) applications or hydrogen enrichment of thermal engines.

In the text below, this type of reactor will be called a POX reactor, the usual abbreviation of partial oxidation reactions.

The use of a partial oxidation reactor for carrying out the generation of synthesis gas, and more particularly an H2-rich synthesis gas, is not original in itself. By contrast, however, the technology of the reactor that is used may be capable of novelty in a field where for low power levels, the majority of the players are oriented toward catalytic and non-thermal POX concepts so as to avoid having to manage temperatures higher than 900 or 1000° C.

In some cases, the strongly exothermic partial oxidation reactions are followed by endothermic vaporeforming reactions, whereby the introduction of water vapor may take place in the form of partial oxidation reactions or in the form of vaporeforming reactions. All of the partial oxidation and vaporeforming reactions, when they take place simultaneously in the same reaction chamber, are then designated under the name of an autothermal process (ATR abbreviation).

This invention relates to the technology of the reactor for implementation of the non-catalytic POX reactions and also applies when these non-catalytic POX reactions are followed by catalytic vaporeforming reactions, whereby the two types of reactions take place in separate reaction chambers.

The technology of the POX reactors has been experiencing a renewal of interest for several years in connection with the production of H2 for the purpose of supplying a fuel cell (PAC). This interest for a suitable POX reactor technology is quite often encountered within the context of on-board reactors when the PAC is intended to provide electric energy for the motorization of a vehicle.

Below, we are providing a general picture of recent developments in the technology of POX reactors in the non-catalytic domain:

In 2000, OEL-WARME Institut published two articles on the design of a partial oxidation reactor developed at the Université d'Aix la Chapelle. In this reactor, the chamber is essentially divided into two parts: a first part termed the cold flame zone in which the hydrocarbons are mixed with preheated air so as to obtain a controlled oxidation reaction at a temperature of between 310° C. and 480° C., now called cold flame, and a second part that constitutes the core of the POX with a temperature of higher than 1000° C.

During the start-up, the hydrocarbons are vaporized in the preheated air to start up the cold flame. Then, the air temperature is lowered to obtain conditions for stabilization of the cold flame in the first part of the reactor where the temperature is kept lower than 480° C. because beyond this temperature, the reaction goes out of control by ignition of the fuel-air pre-mixture and transition from the cold-flame state to the standard combustion state.

The adiabatic combustion temperature is then essentially reached. The start-up of the POX section is carried out by standard ignition. The authors believe that the cold flame offers a determining advantage in that it would be responsible for the low level of soot that is observed experimentally.

This concept may very likely lead to a limitation of the soot production because of the premixing and the oxidation of heavy molecules of the fuel that are produced in the cold flame, but it imposes very significant limitations on the preheating temperature of the air and the fuel. Actually, beyond 480° C. in the cold flame and therefore from a preheating of the air-fuel mixture that is higher than about 350° C., there is a risk of losing control of the reaction and a return of flame into the cold flame chamber.

This limitation of the preheating produces a very significant economic penalty because a large fraction of the fuel is then to be oxidized to reach the reaction temperature, which greatly penalizes the yield of the generator relative to a system where it would be possible to preheat the air to more than 1000° C. before the input into the combustion zone.

In the reactor concept according to the invention, it is also sought to limit the formation of the soot but by removing the constraint on the preheating of the air and the feedstock. To do this, it was chosen to optimize the hydrodynamics of the reactor by dividing the reaction zone where the POX reaction is carried out into a first perfect-mixing reaction zone followed by a second piston reaction zone with or without a staged injection of oxidant.

U.S. Pat. No. 3,516,807 of June 1970 of Texas Instruments refers to an integrated POX reactor in which is carried out the preheating of air entering via the combustion effluents with the use of the fuel injector as a Venturi tube being used to draw in the combustion air as a particular feature. This design element of the injector is repeated in the claims. The importance of the thermal integration on the yield is not noted; by contrast, it is clearly indicated in the text that the reactor should operate at a temperature of 1200° C. or more to lead to reasonable dwell times, and therefore it is imperative to preheat the air that enters with the combustion gases.

Relative to this patent, this invention is based on a considerably more advanced thermal integration in which is considered the possibility of reaching chamber temperatures that are higher than 1300° C. and even 1500° C. to limit both the dwell times and the soot formation in the partial oxidation chamber.

Likewise, for the reduction of soot and non-burned methane or non-methane residues, it is very important to consider the hydrodynamics of the POX reactor so as to carry out the combination of a first reaction zone with an essentially isothermal perfect mixing flow and a second reaction zone with a piston flow that is also essentially isothermal, at least over a portion of its length.

In a publication by P. Marty; M. Falempe; and D. Grouset entitled "The Use of Semi-Detailed Kinetic Diagrams for a Study of the Influence of Temperature in the Reforming of Fuels Without a Catalyst," presented at the Belfort Conference in November 2000, note is taken of a reactor that is improperly called an autothermal reactor (ATR) because of the heat recovery carried out on the combustion gases. Actually, it is possible to derive from information contained in said publication that the concern for thermal integration was duly taken into account by the author for designing a reactor that operates at a short dwell time, but there is no information on the technology to use for optimizing thermal transfers and heat recovery and to carry out flows so as to limit soot formation.

Patent WO 96/36836 describes a staged combustion system with integrated preheating, i.e., a heat exchange between the combustion gases and the combustion air. This patent essentially describes a method for reducing the NOX that makes use of two combustion chambers.

Patents EP 0 255 748 B, EP 0 291 111 B and U.S. Pat. No. 5,653,916 describe a non-catalytic POX reactor that has a burner technology that consists of at least 4 concentric tubes that are alternately supplied by an oxidizing gas that contains oxygen and by a hydrocarbon-rich gas. The momentum that is necessary to the mixing is essentially created by the injection speed of the hydrocarbon that is between 50 and 150 m/s.

Patent EP 0 380 988 B describes a partial oxidation reactor that uses an injector that consists of 3 concentric tubes. The central tube makes it possible to inject water vapor or CO2 at a supersonic speed at the mixing point of the combustion air and the fuel.

This injection makes it possible to obtain a very quick mixing and therefore in principle to limit the soot formation.

U.S. Pat. No. 5 98 297 proposes a non-catalytic POX reactor technology that is also applicable for the POX section of ATR reactors. The operating temperatures are between 1000 and 1500° C. for the POX and between 900° C. and 1400° C. for the ATR.

A reduction of the alumina contained in the refractory materials (containing about 90% alumina) into volatile aluminum oxides was observed at these temperature levels that correspond to a reducing atmosphere in the reactor.

To eliminate this problem, the cited patent teaches carrying out on the wall of the reactor or behind said wall an endothermic vaporeforming reaction by circulation of a portion of the gases that have not reacted upon contact with said wall, whereby the latter was made catalytic. The vaporeforming reaction employed makes it possible to lower the wall temperature by 100° C. to 300° C. and therefore to limit the reduction of alumina.

U.S. Pat. No. 0 9732A1 relates to the integration of a POX reactor with a fuel cell (PAC) of solid-oxide type (SOFC). The diagram of the process exhibits a high degree of integration between the hydrogen generator and the SOFC cell, whereby the effluents of the cell are used to preheat the combustion air of the POX.

A zone for recirculation of the combustion gases is located at the fuel injection site so as to homogenize the temperatures and to limit the formation of soot. The integration of the POX with the cell itself requires that the POX operate at temperature levels that cannot exceed 1000° C. At this temperature, the reaction times are relatively significant, on the order of several seconds, and there is a risk of obtaining relatively large methane concentrations in the effluents of the POX.

SUMMARY DESCRIPTION OF THE INVENTION

One of the objects of the invention is to eliminate the drawbacks of the prior art. More specifically, the invention relates to a partial oxidation reactor that comprises an elongated jacket along an axis of any orientation, means (12) for supplying a preheated gas that contains oxygen (generally air) and optionally water vapor, means (9) for supplying a hydrocarbon feedstock, and means (11) for evacuation of a hydrogen-rich effluent, characterized in that it comprises in combination a first internal chamber (5) inside of which is carried out an essentially isothermal partial oxidation reaction that is connected to means (9) for supplying the hydrocarbon feedstock and to means (12) for supplying preheated gas, whereby said reactor comprises gas turbulizing means that are suitable for creating a perfect mixing flow in chamber (5), means (8) for linking first chamber (5) to a second chamber (7) of a suitable volume for carrying out a piston flow, linking means (8) that comprise at least one orifice, and second chamber (7) exchanging heat in an indirect manner over at least a portion of its length with means (12) for supplying said thus preheated gas, whereby second chamber (7) is connected to said evacuation means (11) of the hydrogen-rich effluent.

A perfect-mixing reactor is defined as a reactor in which a significant recirculation of reactive fluids, in this case gaseous, is generated, before the output of the reactor, and in which the recycling rate is equal to or greater than 25% and preferably greater than 50%.

Recycling rate is generally defined as the ratio between the amount of effluents leaving the reactor and sent to the input of said reactor, and the amount of fresh feedstock. When internal recirculation is required, it is necessary to imagine a flow of reagents that circulate inside the reactor, for example in the form of an internal loop, and to relate the flow of this loop to the flow of feedstock entering the reactor.

In the same way, a piston reactor is defined as a reactor in which internal recirculations are limited to 10% maximum, without specifying a constraint on the axial dispersion of dwell times linked to the flow speed.

According to a characteristic of the reactor, the gas turbulizing means inside first chamber (5) can be selected from among the group that is formed by an internal gas recirculation ring, a baffle and a separate injection device and essentially in countercurrent to the feedstock on the one hand and the gas containing oxygen on the other hand.

The invention relates to the technology of a POX reactor that is used for carrying out a non-catalytic partial oxidation reaction, which may or may not be followed by a vaporeforming reaction.

The partial oxidation reaction is a strongly exothermal reaction that requires that the reagents be made to be present in a partial oxidation chamber under suitable temperature and mixing conditions.

The reagents consist of, on the one hand, a hydrocarbon feedstock that can be any liquid hydrocarbon ranging from LPG (Liquefied Petroleum Gas) to heavy fuels, or else an alcohol, for example ethanol, or else an oil that is made from biomass, such as, for example, colza oil or sunflower seed oil, and, on the other hand, a mixture of water vapor and combustion air. The heating of the mixture of water vapor and combustion air can be carried out by a heat exchange between said mixture and the effluents of the reaction that are generally available at temperatures of between 1000° C. and 1700° C.

The precise qualification of the perfect mixing or piston flows can be done by dwell time distribution methods that rely on marking a segment of the flow that is thus followed during its passage from the reaction zone. Qualitatively, if the dwell time distribution of the marked segment that is observed at the output of the reaction zone is very broad, a perfect mixing flow will be mentioned, and if, on the contrary, this distribution is very narrow, piston flow will be mentioned.

There are methods that are well known to one skilled in the art for characterizing specifically a given flow, and this invention is not linked to any criterion for assessing the type of flow.

This invention is characterized by a significant and sudden change in the flow mode in the passage from a first purely thermal reaction chamber that exhibits a perfect mixing flow nature to a second reaction chamber that exhibits a piston-flow nature, in which the reactions that were begun in the first reaction chamber continue, optionally completed by catalytic vaporeforming reactions.

Preferably, the first reaction chamber is adiabatic and the second reaction chamber consists of two zones, a fist zone that is also adiabatic, and a second zone that promotes a significant heat exchange between the cold gas that contains oxygen, generally air, optionally with an addition of water vapor, and warm effluents from the reaction so as to quickly cool the latter.

The operating temperatures of the first reaction chamber and optionally the temperature of the first zone of the second chamber are high, generally between 1100° C. and 1800° C. and preferably between 1400° C. and 1650° C., and are adjusted based on the type of feedstock.

This selection will be established based on the characteristic curves of soot formation so as to make the maximum move away from the critical zone that can vary according to the nature of the feedstock, particularly based on the number of carbon atoms.

The operating pressure of the first reaction chamber will be generally between 1 and 20 bar absolute (1 bar=0.1 MPa) and preferably between 2 and 5 bar absolute.

The amount of oxygen that is introduced preferably by the combustion air will usually be such that the mass ratio of this amount to the amount of stoichiometric oxygen will be between 0.1 and 0.6, and preferably between 0.2 and 0.4. The water vapor flow that is added to the oxygen-containing gas, generally air, will advantageously be such that the H2O/C molar ratio, where C represents the amount of carbon that is contained in the feedstock, is between 0 and 2, and preferably between 0.2 and 0.8.

The purpose of the first perfect-mixing reaction chamber is to carry out combustion without a flame front, which makes it possible to limit the local temperatures and to operate with a homogeneous richness, creating a significant reduction in soot formation.

Theoretically, the dwell time in this first reaction chamber should be very high to limit the local richness and to ensure maximum recycling of free radicals. The limitation of the dwell time is provided by practical constraints of equipment size. A dwell time in the first perfect-mixing reaction chamber will be selected between 0.05 second and 1 second and preferably between 0.1 second and 0.3 second.

The second piston and adiabatic reaction chamber makes it possible to eliminate the last traces of unconverted hydrocarbons, in particular the hydrocarbons such as methane, and the acetylene compounds that have been formed in the first perfect-mixing reaction chamber. The sizing of the second reaction chamber with piston flow is directly linked to the operating temperature. For a temperature of 1600° C., a dwell time of, for example, 0.05 to 0.3 second will be selected. The dwell time can be increased if the temperature is lowered.

The dwell time in the second chamber will typically be located between 0.05 second and 1 second and preferably between 0.1 second and 0.3 second. This second chamber also ensures the preheating of the oxygen-containing gas to a temperature of between 800° C. and 1400° C. and preferably to a temperature of between 1000° C. and 1300° C. by means of an indirect heat exchange with hot effluents that are obtained from the first chamber.

The second chamber is made of a ceramic-type material or a metallic material that is optionally coated on the side of the hot fluid by a porous or non-porous ceramic material.

The linking between the first reaction chamber and the second reaction chamber will generally be carried out by means of an orifice that is intended to create a certain pressure drop in the passage from the first to the second reaction chamber or by means of a porous wall or any means that is known to one skilled in the art such as a multiaperture plate or a honeycomb plate.

According to a characteristic of the invention, the gas supply means comprise an annular chamber that is essentially coaxial with the reactor jacket, whereby the second reaction chamber is also essentially coaxial with the reactor jacket.

According to another variant, the annular chamber of the gas supply means surrounds the first and the second chamber, the unit formed by the annular chamber, whereby the first and the second chamber are essentially coaxial.

The sealed wall that separates the second chamber and the first chamber of the annular gas supply chamber that contains oxygen can be made of a ceramic-type material that is selected from among the following materials: silicon carbide, alumina, zirconia, silicon nitride or mullite.

In this case, the attachment of this wall to the outside jacket will be carried out on the cold side, i.e., the side that corresponds to the input of the mixture of water vapor and air.

According to another variant of the invention, the wall can be made of a metallic material. In the latter case, the attachment of said wall to the outside jacket will also be done on the cold side by means of, for example, a flange. In all of the cases, the free expansion of the wall will be done on the warm side, i.e., the side that corresponds to the contact zone of the reagents.

In all of the cases, the critical point of the system is the thermal exchange zone at very high temperature that makes it possible to ensure the preheating of the oxygen-containing gas, generally with air optionally with a supply of water vapor, by using as a coolant the effluent gas of the first chamber at more than 1100° C. and preferably at more than 1400° C.

The reactor according to the invention can be used to generate a hydrogen-rich gas, whereby the effluents of the reactor are converted in a high-temperature shift stage, followed by a low-temperature shift stage. The reaction for shifting from gas to water is called a shift reaction, whereby the reaction consists in transforming the CO+H2O mixture into a CO2+H2 mixture.

According to certain applications that are by no means limiting, the reactor according to the invention can be used to generate a high-purity hydrogen that is intended for the supplying of a fuel cell, whereby the shift stages are optionally completed by a selective oxidation stage.

DETAILED DESCRIPTION OF THE FIGURES

Figure 1:
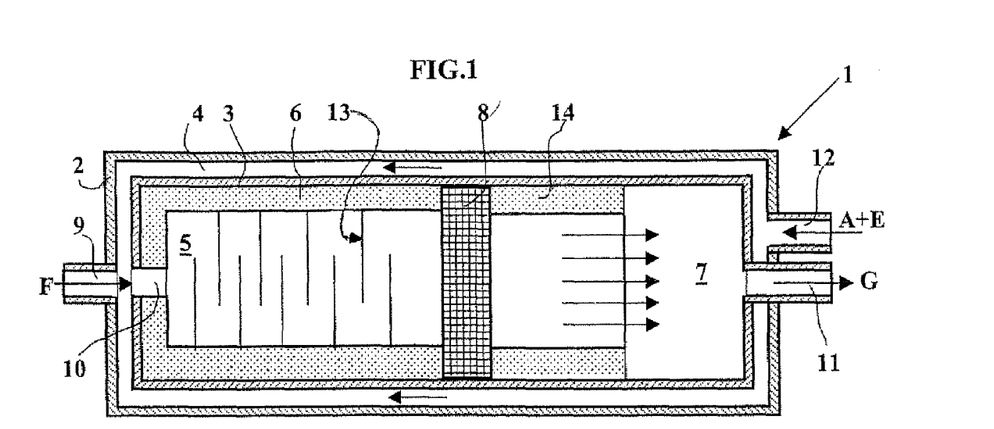
FIG. 1 shows a longitudinal cutaway view of the reactor according to the invention in its single partial oxidation version.

The device according to the invention that we will call reactor-exchanger (1) is shown in FIG. 1 that comprises an essentially cylindrical jacket or chamber (2) with an elongated shape along axis AA' and that comprises a first hydrocarbon input (9) that is located at one of the ends of the chamber and a second input (12) of a mixture of water vapor and air, or air that is optionally enriched with O2, located at the other end of the chamber. We generally call this gas oxygen-containing gas to the extent that there is most often air optionally in the presence of water vapor.

This first chamber contains a second chamber (3) that is essentially cylindrical and coaxial to the first and forms with the first chamber a hollow internal volume (4) that makes possible the passage of the mixture of water vapor and air or O2-enriched air from its input into volume (4) by input pipe (12) to the output of said volume to supply first chamber (5).

This second chamber (3) comprises an input (10) of an effluent that is formed by the mixture of input hydrocarbons and the mixture of water vapor and air or O2-enriched air that is obtained from volume (4), and an output (11) of the effluent of the partial oxidation reaction, containing an H2-rich mixture. Output (11) passes through chamber (2) in a sealed manner. Input (10) of chamber (3) is essentially aligned with input (9) of chamber (2).

The partial oxidation reaction occurs in chamber (3), which is broken down into two chambers:

A first reaction chamber in the direction of the flow that is composed of a hollow internal volume (5), thermally insulated by an adequate heat-insulated thickness (6) that is positioned along the inside walls of chamber (5) and completed by a porous device (8) that generates a pressure drop in the flow, whereby this pressure drop contributes to creating a perfect-mixing reaction chamber (5) in combination with the important recirculation induced in the first chamber by gas reagent turbulizing means, such as baffle (13), for example.

Perfect-mixing reaction chamber is defined as chamber (5) inside which the mixture is introduced at speeds of between 10 and 100 m/s, which makes it possible to induce significant recirculation currents, which are advantageously greater than 50% relative to the flow that enters chamber (5) and which are somewhat reflected by device (8).

A second reaction chamber (7) that is placed downstream from chamber (5) relative to the direction of flow of the reagents and separated from the latter by porous device (8). This second reaction chamber (7) is designed to limit the recirculation, less than 10% relative to the flow that enters chamber (7), so as to carry out a piston flow. A first zone of this second chamber can have heat-insulated walls (14) to maintain essentially adiabatic conditions over a period of between 0 and 0.5 s.

In the second zone of chamber (7), the walls of said chamber (7) are not heat-insulated so as to promote thermal exchanges between the effluent that is internal to said chamber (7) that contains the products of the reaction obtained from chamber (3) and the mixture of air and water vapor that circulates inside hollow volume (4) that surrounds chamber (7).

Porous device (8) can be made from any material that is resistant to the temperatures that prevail in chamber (5) and that exhibits adequate porosity, generally created by orifices that are uniformly distributed over the entire section of the device so as to make possible linking of chambers (5) and (7) while limiting the pressure drop to values of between 10 and 500 millibar, and preferably between 10 and 100 millibar (1 millibar=10-3 bar).

The mixture of water vapor and air penetrates chamber (2) via input (12), heats by circulating along the wall of chamber (3) by heat exchange with the reaction effluents that circulate inside chambers (5) and (7), mixes with the hydrocarbon feedstock that is obtained from input (9), and then is introduced into chamber (5) by means of input (10).

The thus constituted mixture reacts in first chamber (5) in perfect mixing flow, passes through device (8), then reacts in second chamber (7) in piston flow, and finally cools upon contact with the wall of chamber (7) before being evacuated via output (11). The effluents of chamber (7) essentially consist of a mixture that contains CO, H2 and N2 that is called synthesis gas.

Figure 2:
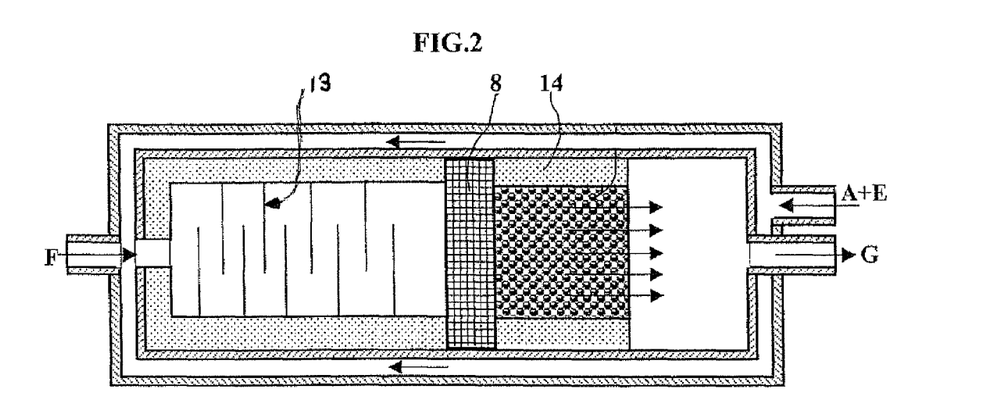
FIG. 2 shows a longitudinal cutaway view of the reactor according to the invention in its ATR version, i.e., combining a partial oxidation reaction and a vaporeforming reaction.

FIG. 2 shows a variant of the device according to the invention in which the adiabatic zone of second chamber (7) in piston flow is occupied by catalyst for the purpose of using a vaporeforming reaction. In this case, the vaporeforming reaction takes place at temperatures of between 1300° C. and 700° C., and preferably between 1200° C. and 900° C.

The vaporeforming catalyst can either come in the form of a bed of balls or extrudates that completely or partially fill the volume of chamber (7) or can be placed on the walls of chamber (7), optionally after an impregnation treatment of the latter (also called a "wash coat" according to English terminology), which makes it possible to increase the specific surface area.

The thermal energy that is necessary to the vaporeforming reaction is brought by the reagents themselves, i.e., the effluents of the partial oxidation reaction that are obtained from chamber (5) and that penetrate chamber (7) through porous system (8).

All of the reactions that take place in chamber (5) and in chamber (7) constitute a thermally balanced process called an autothermal process (ATR).

Figure 3:
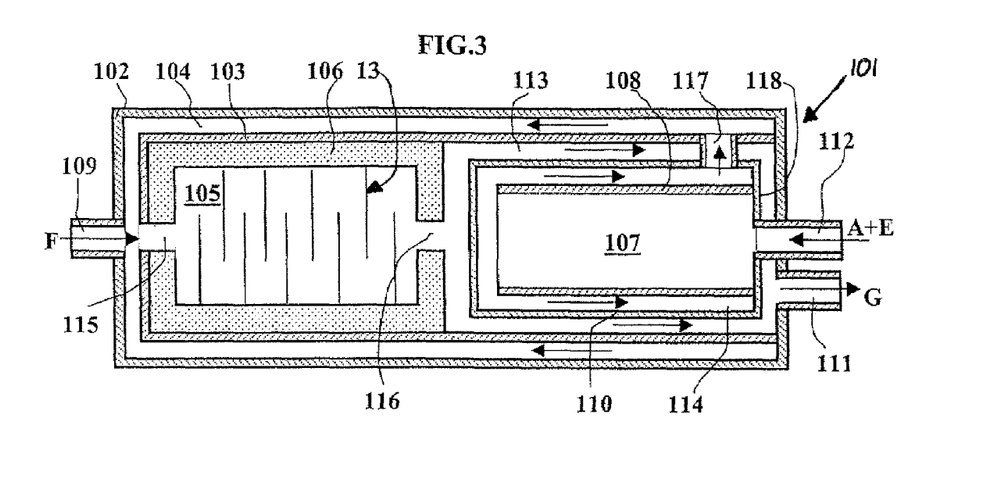
FIG. 3 shows a longitudinal cutaway view of the reactor according to the invention in its single partial oxidation and double exchanger version.

FIG. 3 represents a preferred embodiment of the invention that makes it possible to carry out as well as possible the piston flow into second chamber (7) and the thermal exchanges between the air and water vapor reagents, and the effluents of the partial oxidation reaction that are produced in a portion of chamber (7).

In this embodiment of reactor-exchanger (101), found as in FIG. 1 is a first cylindrical chamber (102) of elongated shape along an essentially horizontal axis AA', comprising an input (109) of hydrocarbons and an output (111) of effluents of the reaction, i.e., hydrogen-rich gas.

This first chamber (102) contains a second chamber (103) that is coaxial to the first and that forms with it a hollow internal volume of an essentially annular shape (104) that makes possible the passage of gaseous reagents, air and water vapor, from their input into said annular zone to their contact with the hydrocarbons that enter via pipe (109). This second chamber comprises an input (115) and an output (111) that is combined with the output that was already mentioned of first chamber (102) because second chamber (103) is attached in a sealed manner to first chamber (102) on the face opposite to the face that contains input (115).

The partial oxidation reaction occurs inside chamber (103), which is itself divided into two reaction zones.

A first reaction zone (105) that is in the direction of the reagent flow and that consists of a hollow internal volume, thermally insulated by a heat-insulated thickness (106) and that has at its output (still in the direction of flow of the reagents) an orifice with a small diameter (116) that generates a certain pressure drop in the flow of the reagents and that is intended to create internal recirculation movements that in combination with the recirculation induced by baffle (13) will impart to said first reaction zone (105) a nature that is close to a perfect mixing flow.

A second reaction zone (113) of an essentially annular shape, constituted by the space that is defined by the inside wall of second chamber (103) and the outside wall of a third chamber (110). This third chamber (110) with an elongated shape along axis AA' and that is essentially coaxial with chambers (102) and (103) comprises an input (112) of the mixture of air and water vapor reagents that in a sealed manner passes through first chamber (102) and consequently also second chamber (103), since these two chambers have a common face that is specifically the face that is traversed by input (112).

Chamber (110) is linked to annular volume (104) via an output (117) that is preferably located close to the common face of chambers (102) and (103). The outside walls of chamber (110) can be heat-insulated along reaction zone (113).

By contrast, the inside walls of chamber (103) are not heat-insulated over the entire length of reaction zone (113) specifically to promote heat exchanges between the warm effluents that come from reaction zone (105) and that circulate inside volume (103), and the mixture of air and water vapor that comes from input pipe (112) and that circulates inside volume (104). The inside walls of chamber (103) can, if necessary, comprise contours intended to increase the exchange surface area.

Third chamber (110) comprises a hollow cylinder (108) that is attached to wall (118) of said chamber, whereby this wall is the one that is parallel and the closest to the wall common to chambers (102) and (103). This hollow cylinder defines a first volume (107) that is linked directly to input pipe (112).

Hollow cylinder (108) is open on its face opposite to wall (118) and defines with the inside wall of chamber (110) a second annular volume (114) that itself is linked to annular space (104) via pipe (117). Thus, the mixture of water vapor and air penetrates chamber (107) by means of input pipe (112), leaves chamber (107) to enter second annular volume (114) where it is reheated upon contact with the wall of chamber (110). The mixture of water vapor and air leaves annular volume (114) via output pipe (117) and penetrates first annular volume (104) where it again reheats upon contact with the wall of reaction zone (113).

At the input (115) of second chamber (103), the mixture of water vapor and air flowing through first annular volume (104) enters into contact with the hydrocarbons that are obtained from pipe (109).

The reagents penetrate the first perfect-mixing reaction chamber (105) that they leave via orifice (116) so as to penetrate second reaction zone (113) in a piston flow, heat-insulated on its first portion to ensure an adiabatic reactor function that makes it possible to oxidize the hydrocarbons that are residual but not heat-insulated over its second portion to ensure cooling along the walls of chambers (103) and (110).

The reaction effluents that contain a majority of H2 and CO leave the second reaction zone via output pipe (111).

Figure 4:
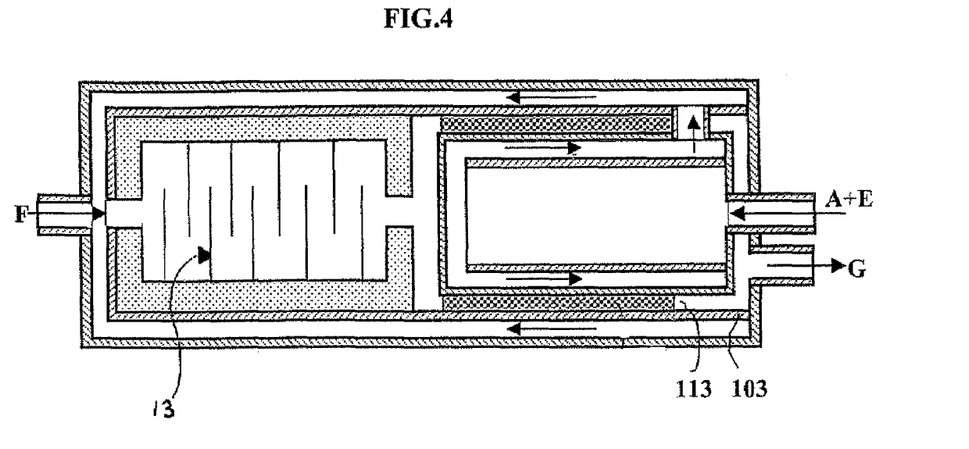
FIG. 4 shows a longitudinal cutaway view of the reactor according to the invention in its ATR and double exchanger version.

FIG. 4 represents another embodiment according to the invention in which is found the configuration that was previously described and illustrated by FIG. 3, but in which second reaction chamber (113) contains a vaporeforming catalyst, either in the form of a particle bed totally or partially filling said chamber (113) or deposited in the form of a coating along the walls of chambers (103) and (110) of said zone (113).

The thus formed ATR reactor exhibits excellent thermal integration since these are the reagents of the vaporeforming reaction, i.e., the effluents of the partial oxidation reaction that provide the calories that are necessary to said vaporeforming reaction.

Figure 5:
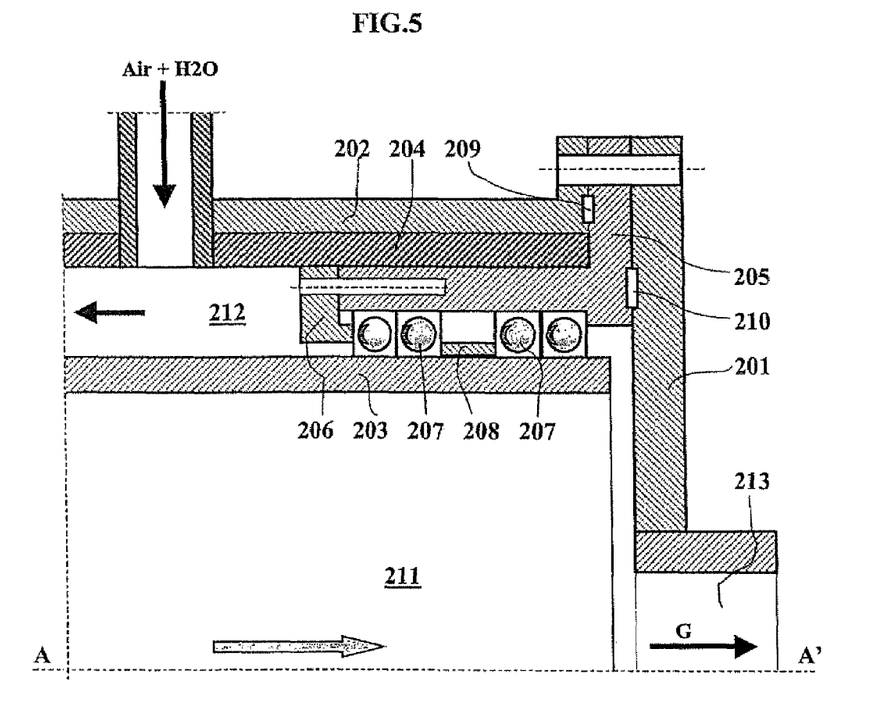
FIG. 5 shows a longitudinal cutaway view of an embodiment of the link between the wall and the external jacket in the case where the wall is made of ceramic material.

FIG. 5 shows an example of a sealed connecting system that is used to connect internal jacket (203) to external jacket (202) in the case where internal jacket (203) is made of ceramic material. Internal jacket (203) is kept clamped in packing gland (205, 206, 207, or 208).

Joints (207) ensure both holding jacket (203) relative to flange (205) but also the sealing between hollow volume (211) and annular hollow volume (212). In this way, internal jacket (203) is attached to external jacket (202) by flange (205).

External jacket (202) is insulated thermally by a layer of insulating material (204) that can be, for example, an alumina-based textile or a refractory concrete that is not very dense.

External jacket (202) is closed by bottom (201) that makes possible the evacuation of the effluents of the reaction via pipe (213).

The connection between flange (205) and bottom (201) ensures the sealing between the inside and the outside of the reactor via joint (210).

Figure 6:
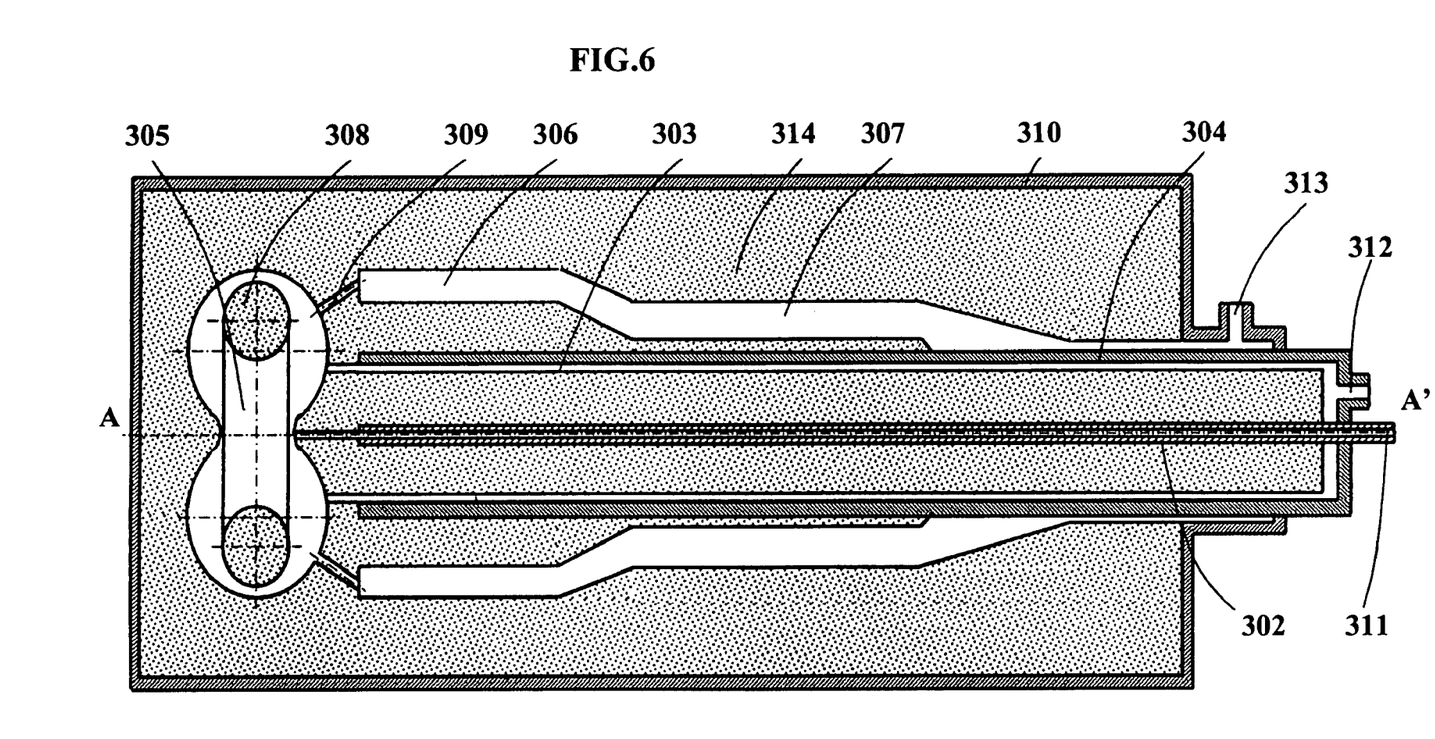
FIG. 6 shows a preferred view of the invention in which the POX combustion chamber operates with a significant recirculation of combustion gases because of the internal ring that accelerates the gases on the wall. This chamber is followed by an essentially piston and essentially adiabatic annular chamber that ensures the destruction of residual hydrocarbons and is equipped with a conical-type reduction that makes it possible to make the synthesis gas gradually converge on the metallic or ceramic tube that ensures the exchanger function. The gradual reduction makes it possible to cool the synthesis gas before contact with the metallic or ceramic tube to avoid the destruction of the latter by excessive temperatures in the reducing environment.

FIG. 6 exhibits a preferred embodiment of reactor-exchanger (301) in which the perfect mixing flow is obtained by the presence of a ring in the combustion chamber that ensures a significant recirculation of the combustion gases.

As in the preceding cases, a first cylindrical chamber (310) that is protected thermally inside by heat insulation (314) and that has an elongated shape along an essentially horizontal axis AA' and that comprises an output (313) of effluents from the reaction, i.e., a hydrogen-rich gas, is found.

This first chamber (310) contains a second chamber of essentially tubular shape (304) that is coaxial to the first and that forms with it a hollow internal volume (306 and 307) that makes possible the passage of the effluents of the reaction. This second chamber comprises an input (312) of gaseous reagents, air and water vapor, and is connected in a sealed way to said first chamber (310).

Second chamber (304) contains a third chamber that has an essentially tubular shape (302) that is coaxial to the second and that forms with it an essentially annular hollow internal volume (303) that makes possible the passage of gaseous reagents, air and water vapor, from their input into said annular zone until their contact with the hydrocarbons at chamber (305).

Third chamber (302) that can be heat-insulated as in FIG. 6 comprises an input (311) of hydrocarbons and emerges in reaction chamber (305).

The partial oxidation reaction occurs inside chamber (310) that is itself divided into two reaction chambers and a heat exchange zone:

A first reaction chamber (305) that consists of a hollow internal volume of essentially toric shape and that comprises a toric insert (308) so as to generate a significant recirculation of the combustion gases and to impart to said first chamber (305) a nature that is close to a perfect mixing flow.

A second reaction chamber (306) of an essentially annular shape that consists of the space that is defined by the heat-insulated inside wall of first chamber (310) and the outside wall that is also heat-insulated of second chamber (304).

The hollow volume that is thus formed is therefore entirely heat-insulated so as to obtain an essentially adiabatic chamber with a piston flow that ensures the destruction of residual hydrocarbons.

This second chamber (306) is connected to first chamber (305) by several holes (309), the number and the diameter of which are defined so as to obtain a pressure drop that is adequate for this location such that at least 50% of the combustion gases that circulate in first chamber (305) recirculate there in the meaning previously given in the term recirculation levels.

A third heat exchange zone (307) that also consists of the space that is defined by the heat-insulated inside wall of first chamber (310) and the outside wall of second chamber (304) on which the thickness of the heat insulation varies according to the distance traveled by the effluents of the reaction so as to gradually make said effluents converge on the walls of chamber (304) that ensures the exchanger function.

This gradual reduction in thickness makes it possible to cool the synthesis gas before contact with the metallic or ceramic tubular chamber (304) to prevent the destruction of said chamber by excessive temperatures in the reducing environment.

Thus, in this embodiment and contrary to preceding cases, the mixture of water vapor and air circulates in internal chamber (304) and the effluents that are produced by the reaction circulate in the external chamber.

The mixture of water vapor and air penetrates chamber (304) by input (312), reheats by circulating along the inside wall of chamber (304) by heat exchange with the reaction effluents that circulate between chambers (310) and (304), and mixes with the hydrocarbon feedstock that is obtained from chamber (302) in first reaction zone (305).

Said mixture reacts in first perfect-mixing reaction chamber (305) then penetrates second piston reaction chamber (306) via holes (309). The thus formed reaction effluents cool in exchange zone (307) upon contact with the wall of chamber (304) and then are evacuated via output (313).

EXAMPLE 1 (FOR COMPARISON)

The example for comparison below makes it possible to compare on a typical partial oxidation feedstock the performance levels of a traditional POX reactor, i.e., operating at a relatively low temperature with fairly loose thermal integration, with those of a reactor-exchanger according to the invention.

The synthesis gas that is produced contains an H2+CO mixture that can be sent as is to an SOFC cell if the initial feedstock is low in sulfur.

The H2 that is thus obtained is used for the supply of a solid-oxide-type fuel cell (SOFC) with a power of 10 kW.

A traditional POX reactor that has a 13-liter reaction zone volume is supplied by a butane feedstock and a mixture of water vapor and air.

The butane is preheated in an external exchanger at 450° C. by using the effluents of the partial oxidation reaction as hot fluid.

The preheating temperature is set at 450° C. to limit the cracking risks of the fuel and to make possible the use of a standard effluent feedstock exchanger. The water vapor flow rate is limited to increase the efficiency of the reactor while limiting the soot formation. The H2O/C molar ratio is therefore set at 0.2.

The air flow rate is fixed to reach 1200° C. in the reactor, and it corresponds to an injected air/stoichiometric air ratio of 0.358.

The preheating temperature of the air and the water vapor is set at 450° C. This preheating is carried out with an external exchanger that uses the heat of the effluents of the POX reaction.

The overall dwell time in the reaction zone (perfect mixing chamber plus a piston-flow chamber) is 1 second.

With such sizing, the calculations made by means of Chemkin and PROII commercial software show that the efficiency of the reactor is 44%.

This efficiency is defined as the ratio of the PCI of the effluent of the POX reaction multiplied by the H2 flow rate that is produced to the PCI of the entering feedstock multiplied by the flow rate of entering feedstock.

The total hydrocarbon yield is 13%, of which 9% is methane.

The amount of soot at the output of the reactor is 0.2% by weight.

EXAMPLE 2 (ACCORDING TO THE INVENTION)

A reactor-exchanger according to FIG. 6 of this invention is supplied by the same amounts of butane, on the one hand, and by a mixture of air and water vapor, on the other hand. The butane is preheated to 450° C. in the same external exchanger as in the preceding example.

The H2O/C molar ratio is set as in the preceding example at 0.2.

The temperature for preheating the air and the water vapor results from a heat exchange with the effluents of the reaction zone according to the diagram of FIG. 6.

The flow rate of air entering via pipe (312) is set so as to reach a temperature of 1600° C. in first reaction chamber (305), and the ratio between the flow rate of entering air and the flow rate of stoichiometric air is 0.34.

While the heat exchange between the effluents of the reaction and the mixture of air and water vapor has taken place over the entire path (304), (305), (306) and (307), the air-water vapor mixture arrives in first chamber (305) at a temperature of 1250° C.

The overall dwell time in the first reaction chamber is 0.8 second, and the dwell time in the second reaction chamber is 0.2 second.

A ring (308) combined with the narrowing of chamber (305) upon the arrival of the feedstock promotes the recirculation of the feedstock and effluents in the first chamber.

The recirculation rate is about 80%.

The calculations made on the Chemkin and PROII software provide an efficiency of the reactor, which is calculated in the same way as above, of 71%.

The total hydrocarbon yield (methane included) is very low, or less than 0.5%. The amount of soot at the output of the reactor is 100 ppm (part by weight per million).

These excellent results can be attributed to the combined effect of hydrodynamics that ensure a first perfect mixing adiabatic chamber and a second piston adiabatic chamber, combined with an increase in temperature in the first reaction chamber, which is itself made possible by a higher level of preheating of the mixture of air and water vapor.

The increase in temperature in the first reaction chamber makes it possible to operate in combustion without a flame front and to contribute directly to the reduction in the amount of soot formed.

In addition, contrary to the case according to the state of the art, the dwell time in the reaction zone, and more particularly in the second reaction chamber that is the object of heat exchanges, could be significantly reduced without a major effect on the formation of soot and the yield of methane, which would be reflected by a reduction in the bulkiness of the reactor.

For example, if a dwell time of the first and second chamber that is reduced to 0.2 second relative to the overall dwell time of 1 second corresponding to the example is considered, the reaction volume would therefore be reduced by a factor of 5. The efficiency of the reactor would remain unchanged, since this efficiency essentially results from the temperature level that is attained in the first chamber.

The hydrocarbon yield would remain less than 0.5% and the amount of soot at the outlet of the reactor would be slightly increased to pass to 150 ppm, because of the lower oxidation of the latter.

The invention claimed is:

1. A partial oxidation reactor comprising:
   an elongated jacket along an axis of any orientation,
   means (12) for supplying a preheated gas that contains oxygen and optionally water vapor,
   means (9) for supplying a hydrocarbon feedstock,
   means (11) for evacuation of a hydrogen-rich effluent,
   a first internal chamber (5) within said jacket for carrying out an essentially isothermal partial oxidation reaction, wherein said first internal chamber is connected to said means (9) for supplying hydrocarbon feedstock and to said means (12) for supplying preheated gas,
   gas turbulizing means (13) within said first internal chamber (5), and
   means (8) for linking said first chamber (5) to a second chamber (7), wherein said second chamber has a volume suitable for carrying out a piston flow, said linking means (8) comprising at least one orifice, and said first and second chambers indirectly exchange heat over at least a portion of their lengths with said means (12) for supplying preheated gas, wherein said second chamber (7) is connected to said means (11) for evacuating hydrogen-rich effluent,
   wherein said means (12) for supplying preheated gas comprises an annular chamber that is essentially coaxial with said jacket, and
   said second chamber (7) is essentially coaxial with said jacket and comprises a first essentially adiabatic zone that is linked to linking means (8) and a second zone that exchanges heat with said means (12) for supplying preheated gas.

2. A reactor according to claim 1, wherein said first zone of second chamber (7) contains a vaporeforming catalyst.

3. A reactor according to claim 2, wherein said gas turbulizing means inside said first chamber (5) is an internal gas recirculation ring, a baffle, or a separate injection device that is essentially in countercurrent to the feedstock, on the one hand, and the oxygen-containing gas, on the other hand.

4. A reactor according to claim 1, wherein said second chamber is made of a ceramic-type material or a metallic material that is optionally coated on the side of the hot fluid by a porous or non-porous ceramic material.

5. A reactor according to claim 1, wherein said gas turbulizing means inside said first chamber (5) is an internal gas recirculation ring, a baffle, or a separate injection device that is essentially in countercurrent to the feedstock, on the one hand, and the oxygen-containing gas, on the other hand.

6. A reactor according to claim 5, wherein said first chamber (5) and said second chamber (7) are essentially coaxial with said jacket, and said means (12) for supplying preheated gas comprises an annular chamber which surrounds first chamber (5) and said second chamber (7).

7. A reactor according to claim 1, wherein said first chamber (5) and said second chamber (7) are essentially coaxial with said jacket, and said means (12) for supplying preheated gas comprises an annular chamber which surrounds first chamber (5) and said second chamber (7).

8. A reactor according to claim 1, wherein
   said first chamber (5) has a hollow internal volume in which said gas turbulizing means is positioned, and said first chamber (5) is thermally insulated by an adequate heat-insulated thickness (6) positioned along the inside walls of said first chamber (5), and
   said second chamber (7) comprises a first essentially adiabatic zone that is linked to linking means (8) and a second zone that exchanges heat with said means (12) for supplying preheated gas.

9. A reactor according to claim 8, wherein said first zone of second chamber (7) contains a vaporeforming catalyst.

10. A reactor according to claim 1, wherein
    said first chamber has a hollow internal volume in which said gas turbulizing means is positioned, and said first chamber is thermally insulated by an adequate heat-insulated thickness positioned along the inside walls of said first chamber, and
    said second chamber containing a third internal chamber (110) which forms an essentially annular reaction zone constituted by the space defined by the inside wall of said second chamber and the outside wall of said third chamber, and
    said third chamber (110) being linked to said annular chamber of said means for supplying heated gas, and said third chamber (110) comprising a hollow cylinder (108) that is attached to wall (118) of said third chamber, said hollow cylinder defining a first volume (107) linked directly to input pipe (112) for delivering gas to be preheated, whereby gas to be preheated flows from said input pipe, through said hollow chamber, through said third chamber, and into said annular chamber of said means for supplying heated gas.

11. A reactor according to claim 10, wherein said annular reaction zone of said second chamber contains a vaporeforming catalyst.

12. A partial oxidation reactor comprising:
    a first elongated chamber along an axis of any orientation comprising a first hydrocarbon input for delivering a hydrocarbon feedstock, and a second input for delivering oxygen containing gas,
    a second chamber positioned within said first chamber, wherein said first chamber and said second chamber form a passage, which passage is connected to said second input for delivering oxygen containing gas,
    said second chamber (3) having an input for introducing a mixture of said hydrocarbon feedstock and said oxygen containing gas, and an output (11) for discharging partial oxidation reaction effluent, said input of said second chamber being in fluid communication with said passage and said first hydrocarbon input, said second chamber further comprising a first reaction chamber, a second reaction chamber, and a porous structure connecting said first reaction chamber and said second reaction chamber, said first reaction chamber having a hollow internal volume (5) and a gas turbulizing apparatus comprising baffles within said hollow volume, said first reaction chamber being in fluid communication with said input of said second chamber, and said second reaction chamber being positioned downstream from said first reaction chamber and separated from said first reaction chamber by said porous structure, said second reaction chamber being in fluid communication with said output of said second chamber, wherein said passage comprises an annular chamber, formed between said first chamber and said second reaction chamber (7), and said annular chamber is essentially coaxial with said first chamber.

13. A reactor according to claim 12, wherein said second reaction chamber comprises a first essentially adiabatic zone and a second zone that is in indirect heat exchange with said passage, wherein said first zone of said second reaction chamber contains a vapor-reforming catalyst.

14. A partial oxidation reactor comprising:

an elongated jacket along an axis of any orientation, means (12) for supplying a preheated gas that contains oxygen and optionally water vapor, means (9) for supplying a hydrocarbon feedstock, means (11) for evacuation of a hydrogen-rich effluent, a first internal chamber (5) within said jacket for carrying out an essentially isothermal partial oxidation reaction, wherein said first internal chamber is connected to said means (9) for supplying hydrocarbon feedstock and to said means (12) for supplying preheated gas, gas turbulizing means (13) within said first internal chamber (5), and means (8) for linking said first chamber (5) to a second chamber (7), wherein said second chamber has a volume suitable for carrying out a piston flow, said linking means (8) comprising at least one orifice, and said first and second chambers indirectly exchange heat over at least a portion of their lengths with said means (12) for supplying preheated gas, wherein said second chamber (7) is connected to said means (11) for evacuating hydrogen-rich effluent, wherein said means (12) for supplying preheated gas comprises an annular chamber that is essentially coaxial with said jacket, said second chamber (7) is essentially coaxial with said jacket, said gas turbulizing means inside said first chamber (5) is an internal gas recirculation ring, a baffle, or a separate injection device that is essentially in countercurrent to the feedstock, on the one hand, and the oxygen-containing gas, on the other hand, and wherein said first chamber (5) and said second chamber (7) are essentially coaxial with said jacket, and said means (12) for supplying preheated gas comprises an annular chamber which surrounds first chamber (5) and said second chamber (7).

15. A partial oxidation reactor comprising:

an elongated jacket along an axis of any orientation, means (12) for supplying a preheated gas that contains oxygen and optionally water vapor, means (9) for supplying a hydrocarbon feedstock, means (11) for evacuation of a hydrogen-rich effluent, a first internal chamber (5) within said jacket for carrying out an essentially isothermal partial oxidation reaction, wherein said first internal chamber is connected to said means (9) for supplying hydrocarbon feedstock and to said means (12) for supplying preheated gas, gas turbulizing means (13) within said first internal chamber (5), and means (8) for linking said first chamber (5) to a second chamber (7), wherein said second chamber has a volume suitable for carrying out a piston flow, said linking means (8) comprising at least one orifice, and said first and second chambers indirectly exchange heat over at least a portion of their lengths with said means (12) for supplying preheated gas, wherein said second chamber (7) is connected to said means (11) for evacuating hydrogen-rich effluent, wherein said means (12) for supplying preheated gas comprises an annular chamber that is essentially coaxial with said jacket, and said second chamber (7) is essentially coaxial with said jacket.

* * * * *